(12) United States Patent
Rideout et al.

(10) Patent No.: US 10,320,723 B2
(45) Date of Patent: Jun. 11, 2019

(54) PROVIDING CONTEXTUAL INFORMATION AND ENABLING GROUP COMMUNICATION FOR PARTICIPANTS IN A CONVERSATION

(71) Applicant: GOOGLE INC., Mountain View, CA (US)

(72) Inventors: Ariel Lauren Rideout, Sunnyvale, CA (US); Steven Henry Bills, Mountain View, CA (US); Maria Khomenko, Sunnyvale, CA (US); Andrew James Palay, Mountain View, CA (US); Jason Briggs Cornwell, San Francisco, CA (US); Mark Striebeck, San Jose, CA (US); Paul Morell McDonald, Danville, CA (US); Zohair Hyder, San Mateo, CA (US); Richard James Treitel, Mountain View, CA (US); Jamison Richard Gray, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 503 days.

(21) Appl. No.: 14/723,335

(22) Filed: May 27, 2015

(65) Prior Publication Data

US 2015/0341291 A1 Nov. 26, 2015

Related U.S. Application Data

(63) Continuation of application No. 13/480,334, filed on May 24, 2012, now Pat. No. 9,070,117.

(Continued)

(51) Int. Cl.
*H04L 12/18* (2006.01)
*H04L 12/58* (2006.01)
(Continued)

(52) U.S. Cl.
CPC .......... *H04L 51/046* (2013.01); *G06F 3/0482* (2013.01); *G06F 3/04842* (2013.01);
(Continued)

(58) Field of Classification Search
CPC ... H04L 12/1818; H04L 51/046; H04L 51/16; H04L 51/32; G06F 3/0482; G06F 3/04842; G06Q 10/107
See application file for complete search history.

(56) References Cited

U.S. PATENT DOCUMENTS 7,360,164 B2 4/2008 Bjoernsen et al.
7,464,337 B2 12/2008 Han et al.
(Continued)

FOREIGN PATENT DOCUMENTS

CN 102067641 A 5/2011
JP 2003-058483 A 2/2003
(Continued)

OTHER PUBLICATIONS

Chinese Office Action dated Dec. 16, 2016, which issued in Chinese Application No. 201280025521.1.
(Continued)

*Primary Examiner* — Shourjo Dasgupta
(74) *Attorney, Agent, or Firm* — McDermott Will & Emery LLP

(57) ABSTRACT

Configurations for providing a widget that displays participants involved in the conversation thread and provides different graphical elements (e.g., buttons) to initiate one click actions to start a group chat, create a meeting on each participant's calendar, or start a new conversation thread. In the case of the group chat, the subject technology can include the contents of the group chat session as an additional electronic message in the conversation thread. In one example, the widget is implemented as a floating toolbar that can be positioned in the user interface while in the conversation thread view.

16 Claims, 10 Drawing Sheets

Related U.S. Application Data

(60) Provisional application No. 61/490,592, filed on May 26, 2011.

(51) Int. Cl.
*G06F 3/0484* (2013.01)
*G06F 3/0482* (2013.01)
*G06Q 10/10* (2012.01)

(52) U.S. Cl.
CPC ....... *G06Q 10/107* (2013.01); *H04L 12/1818* (2013.01); *H04L 51/16* (2013.01); *H04L 51/32* (2013.01)

(56) References Cited

U.S. PATENT DOCUMENTS

| | | | |
|---|---|---|---|
| 7,620,902 | B2 | 11/2009 | Manion et al. |
| 8,407,603 | B2 | 3/2013 | Christie et al. |
| 8,499,246 | B2 | 7/2013 | Lyman |
| 2004/0078448 | A1 | 4/2004 | Malik et al. |
| 2005/0114781 | A1 | 5/2005 | Brownholtz et al. |
| 2006/0173962 | A1 | 8/2006 | Ylonen |
| 2006/0179114 | A1* | 8/2006 | Deeds ................. G06Q 10/107 709/206 |
| 2006/0190546 | A1 | 8/2006 | Daniell |
| 2007/0136433 | A1 | 6/2007 | Booton et al. |
| 2007/0245245 | A1 | 10/2007 | Blue et al. |
| 2007/0277110 | A1 | 11/2007 | Rogers et al. |
| 2007/0288560 | A1* | 12/2007 | Bou-Ghannam .... G06Q 10/107 709/204 |
| 2008/0228894 | A1 | 9/2008 | Chen et al. |
| 2008/0229239 | A1* | 9/2008 | Elumalai ................ G06Q 10/10 715/810 |
| 2008/0294730 | A1 | 11/2008 | Oral et al. |
| 2009/0063991 | A1* | 3/2009 | Baron .................. H04L 12/1822 715/751 |
| 2009/0106676 | A1 | 4/2009 | Brezina et al. |
| 2009/0179983 | A1 | 7/2009 | Schindler |
| 2009/0327433 | A1 | 12/2009 | Comertoglu et al. |
| 2010/0299345 | A1 | 11/2010 | Lee et al. |
| 2012/0124483 | A1 | 5/2012 | Zuckerberg et al. |
| 2012/0150970 | A1* | 6/2012 | Peterson ............. G06F 3/04817 709/206 |

FOREIGN PATENT DOCUMENTS

| | | |
|---|---|---|
| JP | 2006-146911 A | 6/2006 |
| JP | 2008-276460 A | 11/2008 |
| JP | 2010522394 A | 7/2010 |
| JP | 2010-262453 A | 11/2010 |
| WO | WO-2006/079877 A1 | 8/2006 |
| WO | WO-2009/31791 A2 | 3/2009 |

OTHER PUBLICATIONS

Korean Office Action from Korean Patent Application No. 10-2013-7031386, dated Jun. 20, 2017.
Boyce, Jim: "Microsoft Outlook 2010 Inside Out," Aug. 11, 2010, Microsoft Press, Print ISBN-13: 978-0-7356-2686-7, chapter 37, 14 pages.
"Add Social Elements to your Gmail Contacts with Rapportive," May 14, 2010, retrieved from http://www.howtogeek.com/howto/16601/add-social-elements-to-your-gmail-contacts-with-rapportive/.
Frantz, "Xobni ]inboX}: Not Just Another Outlook Addin," Technology for Academics, Aug. 16, 2009, retrieved from http://suefrantz/com/2009/08/16/xobni-inbox-not-just-another-outlook-addin/.
"Xobni Puts Yammer in Your Inbox," the Yammer team, May 3, 2011, retrieved from https://blogs.office.com/en-us/2011/05/03/xobni-puts-yammer-in-your-inbox/, 4 pages.
Korean Office Action dated Oct. 24, 2017 from Korean Patent Application No. 10-2013-7031386, 7 pages.
Korean Notice of Allowance from Korean Patent Application No. 10-2013-7031386, dated Dec. 26, 2017, 5 pages.
European Office Action from European Patent Application No. 12789371.7, dated Jan. 25, 2018, 5 pages.
Japanese Office Action from Japanese Patent Application No. 2017-043593, dated Apr. 27, 2018, 5 pages.
Office Action dated Oct. 25, 2013 in U.S. Appl. No. 13/480,334.
Office Action dated Mar. 20, 2014 in U.S. Appl. No. 13/480,334.
Notice of Allowance dated Feb. 27, 2015 in U.S. Appl. No. 13/480,334.
International Search Report and Written Opinion dated Dec. 14, 2012 in International (PCT) Application No. PCT/US2012/039447.
Office Action dated Oct. 25, 2014 in Australian Patent Application No. 2012258624.
Office Action dated Apr. 5, 2016 in Chinese Patent Application No. 201280025521.1, and English translation thereof.
Office Action dated Aug. 29, 2017 in Chinese Patent Application No. 201280025521.1, and English translation thereof.
Office Action issued May 30, 2016 in Japanese Patent Application No. 2014-512119, and English translation thereof.
Notice of Allowance dated Feb. 8, 2017 in Japanese Patent Application No. 2014-512119, and English translation thereof.
Extended European Search Report dated Jan. 21, 2015 in European Patent Application No. 12789371.7.
Office Action dated Dec. 8, 2015 in European Patent Application No. 12789371.7.
Office Action dated Apr. 10, 2015 in Mexican Patent Application No. MX/a/2013/013763.
Notice of Allowance dated Sep. 12, 2018 in Japanese Patent Application No. 2017-043593, and English translation thereof.
Office Action dated Feb. 28, 2019 in Chinese Patent Application No. 201280025521.1, and English translation thereof.

* cited by examiner

PROVIDING CONTEXTUAL INFORMATION AND ENABLING GROUP COMMUNICATION FOR PARTICIPANTS IN A CONVERSATION

CROSS-REFERENCE TO RELATED APPLICATIONS

The present application is a continuation of U.S. application Ser. No. 13/480,334, filed on May 24, 2012, which claims the benefit of priority under 35 U.S.C. § 119 from U.S. Provisional Patent Application Ser. No. 61/490,592 entitled "PIVOT ON PEOPLE," filed on May 26, 2011, the disclosure of which are hereby incorporated by reference in their entirety for all purposes.

BACKGROUND

The Internet has grown to become an important outlet of electronic communication. Tools such as e-mail, instant messaging (IM; sometimes also referred to as "chat") and calendar are popular amongst Internet users and have been provided as different web services. These web services help users stay connected to each other and help them become more productive.

E-mail, IM and calendar web services have generally been considered to be separate and distinct. The aforementioned web services therefore are not designed to efficiently work together in an integrated manner. Moreover, given that an e-mail can include a group of participants (e.g., an authoring participant and one or more recipient participants), a user may wish to communicate with the group of participants in the e-mail while using an e-mail web service. However, communicating between the group of participants across different web services (e.g., IM and calendar) within the e-mail web service is typically not provided in a user-friendly manner

SUMMARY

The subject technology provides for initiating a group communication. Multiple participants included in an electronic message provided in an electronic messaging application are determined. The subject technology provides for display a representation of each of the determined multiple participants in a widget included in the electronic messaging application. In the widget, user input is received to activate a group web service different from the electronic messaging application for the multiple participants of the electronic message. The subject technology activates the different group web service in response to the received user input in the widget in which the activated different group web service initiates a communication thread in the different group web service including at least a subset of the multiple participants of the electronic message.

The subject technology further provides contextual information for multiple participants of an electronic message. Multiple participants included in an electronic message provided in an electronic messaging application are determined. The subject technology obtains contextual information from one or more data sources for each participant in which the one or more data sources respectively correspond to an external web service. A representation of each of the determined multiple participants and the determined contextual information are provided for display in a widget included in the electronic messaging application.

Yet another aspect of the subject technology provides a system for providing contextual information for multiple participants of a conversation thread. The system includes one or more computing devices in which the one or more computing devices include memory, one or more processors and one or more modules stored in memory and configured for execution by the one or more processors. The one or more modules include an electronic messaging module configured to receive one or more electronic messages in a conversation thread between multiple participants. The one or more modules further include a group messaging module configured to activate one of different web services between the multiple participants. Additionally, the one or more modules include a graphical user interface (GUI) display module configured to, in a conversation thread view of the conversation thread, provide for display a representation of the conversation thread in which the representation includes separate display regions.

The subject technology further provides for receiving one or more electronic messages in a conversation thread between multiple participants. In a conversation thread view of the conversation thread, the subject technology provides for display a representation of the conversation thread in which the representation includes separate display regions. The separate display regions include one or more electronic message regions respectively corresponding to each of the electronic messages in the conversation thread, a conversation participants region including different graphical elements representing the multiple participants of the conversation thread, and a group web service region including one or more graphical elements respectively representing one or more different group web services. The subject technology receives user input for selecting a participant among the multiple participants of the conversation thread. In response to the received user input, different contextual data associated with the selected participant is received. Further, the subject technology provides for display the different contextual data associated with the selected participant.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
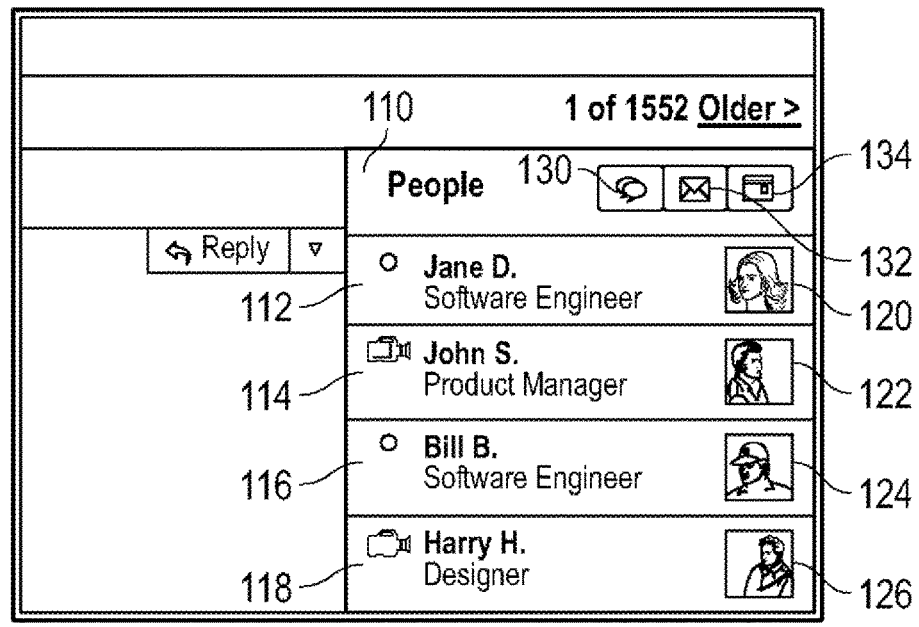
FIG. 1 conceptually illustrates an example graphical user interface (GUI) for displaying a representation of multiple participants in a conversation thread.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

An e-mail application can provide a web-based interface to enable a user to interact with the application. In some configurations, the e-mail application can include other communication functionality such instant messaging (IM), short message service (SMS) and/or video conferencing, etc. The e-mail application can organize electronic messages into one or more different conversation threads in which each conversation thread can include one or more different electronic messages (e.g., an initial message and subsequent reply messages) between one or more participants. As used herein, electronic messages can include, but are not limited to, e-mails, SMS, instant messages, text messages, etc. Other types of electronic messages can be provided and still be within the scope of the subject technology.

An e-mail application in one example provides a web-based interface to enable a user to interact with the application and include instant messaging (IM) functionality. The e-mail application can organize electronic messages into one or more different conversation threads in which each conversation thread can include one or more different electronic messages (e.g., an initial message and subsequent reply messages) between one or more participants. In one example, a user can initiate a new conversation thread by composing a new e-mail with each user's e-mail address in an address field via the application's web-based interface (e.g., within one or more different text box graphical elements). Further, the user can utilize the IM functionality of the application to initiate a chat session with another user.

From a user experience viewpoint, initiating a chat session among multiple participants (e.g., an author and one or more recipients of the e-mail) can be a cumbersome process requiring several interactions from the user. For example, the user can be required to manually add each desired participant in the chat session. Similarly, initiating other group communications, such as creating a group calendar appointment (e.g., by selecting a menu item to launch a calendar application) or creating a new conversation thread with multiple participants, requires the user to manually add each participant or manually retrieve the participant's contact information (e.g., from a contacts list) for inclusion in the group communication. Therefore, communication with different groups of users within the e-mail application is not easily provided by the given functionality in the application.

To address the above issues, the subject technology in one example provides a widget that is shown while viewing a conversation thread in the e-mail application. As used herein, the term "widget" includes its plain and ordinary meaning, including, but not limited to, a lightweight application (e.g., lightweight in comparison to a full application suite or software package) providing a graphical user interface (GUI) that includes one or more graphical elements used to provide a specific application or functionality. Although the subject technology is described with reference to a widget, it should be noted that the subject technology can be used in conjunction with other types of applications.

The widget displays the participants involved in the conversation thread and provides different graphical elements (e.g., buttons) to initiate one click actions to start a group chat, create a meeting on each participant's calendar, or start a new conversation thread. In the case of the group chat, the subject technology can include the contents of the group chat session as an additional electronic message in the conversation thread. In one example, the widget is implemented as a floating toolbar that can be positioned in the user interface while in the conversation thread view.

Additionally, the subject technology provides a single-person view for a selected participant (e.g., as selected from the widget when each participant is listed in the widget) from the conversation thread. By way of example, the single-person view displays the participant's name, contact details, and picture such a profile photo. Additionally, the single-person view allows the user to initiate chat, call, calendar, and mail actions with the participant. Depending on the availability of each of the following data, the single-person view also provides data on recent e-mail communications between the participant and the user, shared documents, and the participant's calendar availability. In one example, the single-person view also includes the participant's data from an online social networking service(s) if available, such as recent status updates or posts.

The subject technology provides a widget that displays contextual information about the conversation's participants or a selected participant of the conversation thread. As used herein, the term "widget" refers to a lightweight application (e.g., lightweight in comparison to a full application suite or software package) providing a GUI that includes one or more graphical elements used to provide a specific application or functionality. Although the subject technology is described with reference to a widget, it should be noted that the subject technology can be used in conjunction with other types of applications.

The following description describes a widget that provides relevant contextual information for the participants in a conversation thread. The widget can aggregate content from different groups of people (e.g., friends, family and colleagues) that is available to the user but may be difficult to find.

I. Example User Interfaces Displaying Participants of a Conversation

FIG. 1 conceptually illustrates an example graphical user interface (GUI) 100 for displaying a representation of multiple participants in a conversation thread. In particular, the GUI 100 includes a widget 110 in a group view that displays different graphical representations of the multiple participants along with corresponding contextual information for each participant in the conversation thread. In some configurations, the widget 110 can be displayed on a right-side portion of the GUI 100. In one example, the GUI 100 is displayed in a user's e-mail or electronic messaging application.

The GUI 100 can include different sets of graphical elements. A graphical element can include, but is not limited to, a button, check box, radio button, slider, list box, drop-down list, menu, combo box, icon, text box, scroll bar, etc.

As shown in FIG. 1, the widget 110 includes different contextual information 112-118 for each participant in the conversation thread. In the example of FIG. 1, the conversation thread includes four different participants. The widget 110 includes a set of avatars 120, 122, 124 and 126 that are respective graphical representations (e.g., thumbnail images, profile photos, etc.) of each participant. To populate the widget 110 with relevant contextual information for each participant, the widget 110 can aggregate information from different data sources. By way of example, the widget 110 can request and receive information from an e-mail web service, a social networking web service, a document web service and/or a calendar web service. As used herein, the phrase "web service" includes its plain and ordinary meaning, including, but not limited to, an online application providing one or more types of functionality via receiving requests over a network such as the Internet.

In FIG. 1, different contextual information 112, 114, 116 and 118 includes a respective participant's name and job title. However, one of ordinary skill in the art would appreciate that any type of contextual information could by provided by the widget 110 and still be within the scope of the subject technology.

The widget 100 further includes a set of buttons 130, 132, and 134 for initiating different group web services for the participants in the conversation thread. As shown, button 130 corresponds to initiating a group chat web service, button 132 corresponds to initiating a group e-mail web service and button 134 corresponds with initiating a group calendar web service. Initiating a group web service for the participants in the conversation thread is described in more detail below. As used herein, the phrase "group web service" includes its plain and ordinary meaning, including, but not limited to, an online application providing one or more types of functionality for a group of users via receiving requests over a network such as the Internet.

II. Example User Interfaces for Initiating a Group Web Service

Figure 2:
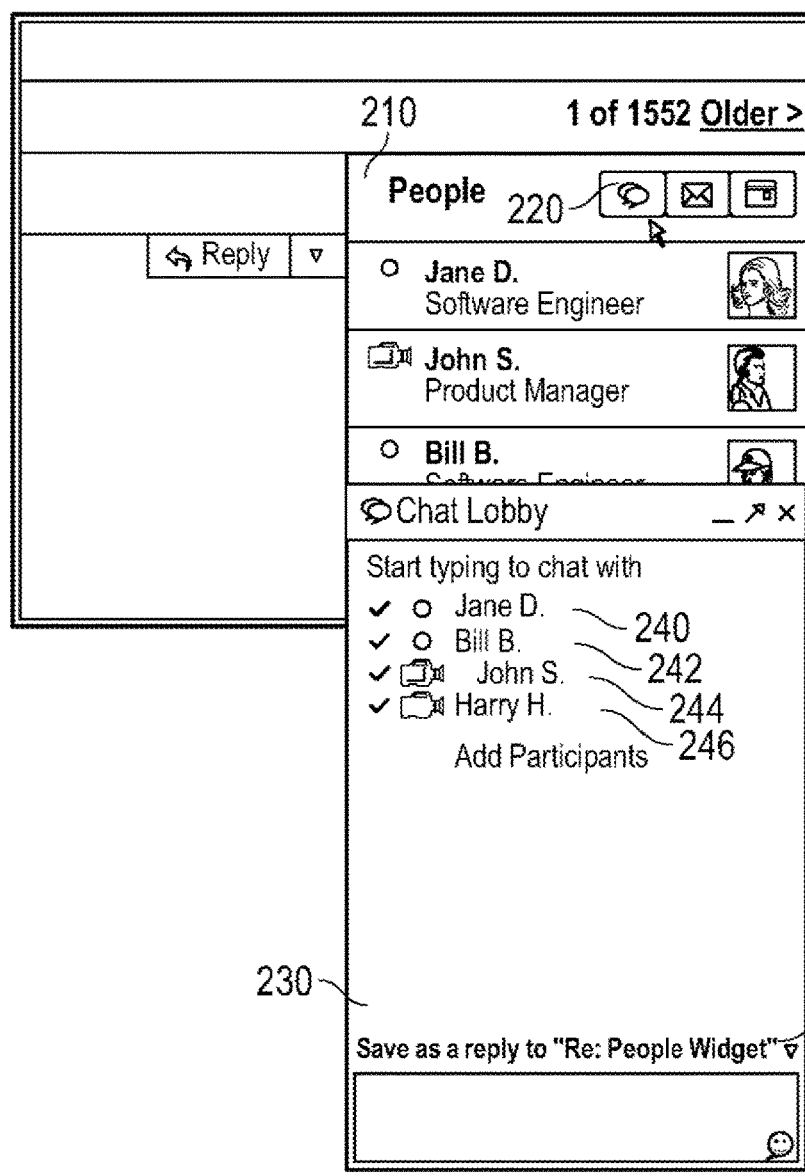
FIG. 2 conceptually illustrates an example GUI for initiating a group web service for multiple participants in a conversation thread.

FIG. 2 conceptually illustrates an example graphical user interface 200 for initiating a group web service for multiple participants in a conversation thread. The GUI 200 includes a widget 210, which is the same as the widget 110 described by reference to FIG. 1, with a chat GUI 230.

As shown in FIG. 2, the GUI 200 includes the widget 210 in a group view that shows the graphical representations of the participants in the conversation thread along with contextual information (e.g., name and job title) for each participant. In one example, the widget 210 receives input (e.g., click input, keyboard shortcut, touch input, voice input, etc.) to select a button 220 to initiate a group chat web service. After the button 220 is selected, the widget 210 initiates a group chat web service that displays the chat GUI 230 containing each participant in the conversation thread. Alternatively, a user can select a subset of the participants in the conservation thread, and then select the button 220 for including the subset of participants in the group chat web service. In this manner, the widget 210 enables participants of the conversation thread to communicate, via a group web service, separately from the conversation thread.

As shown, the chat GUI 230 includes a list of chat participants 240, 242, 244 and 246 corresponding to each participant in the conversation thread. Each participant can then participate in the group chat via the GUI 230. In some configurations, the contents of the group chat can be appended as a new electronic message (e.g., e-mail) in the conversation thread by selecting a menu item 250.

In some instances, the subject technology provides contextual information about a selected participant in the conversation thread. More specifically, the herein described widget displays one or more types of contextual information associated with the selected participant depending on the availability of the contextual information. By way of example, recent emails, online social network posts such as recent status updates, shared documents or calendar events associated with the selected participant can be displayed next to the conversation thread.

III. Example User Interfaces for Displaying Contextual Information

Figure 3:
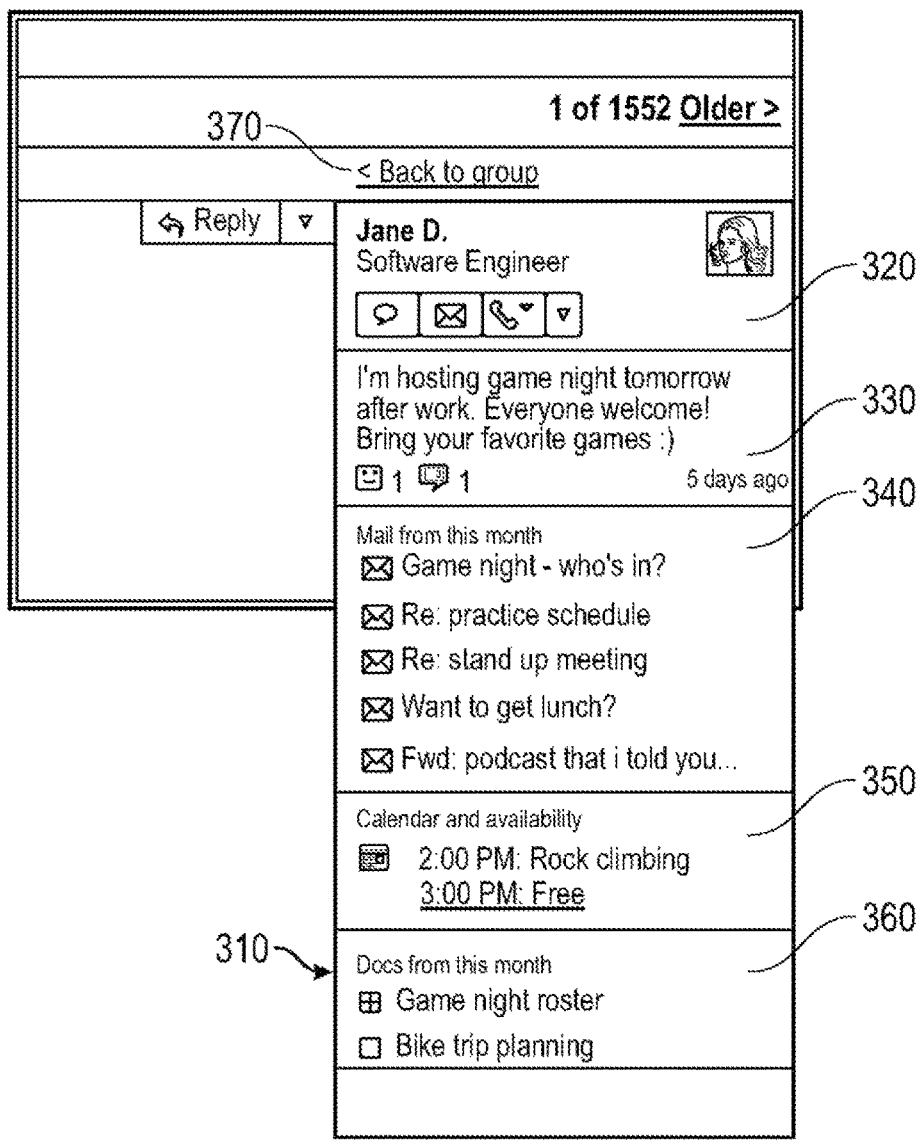
FIG. 3 conceptually illustrates an example GUI for displaying different contextual information for a participant in a conversation thread.

FIG. 3 conceptually illustrates an example graphical user interface 300 for displaying different contextual information for a participant in a conversation thread. In particular, the GUI 300 includes a widget 310 for displaying different contextual information 320-360 for a participant of a conversation thread. In one example, a user activates a single user/person view by selecting one of the participants in the conversation thread. As illustrated in the example GUI 300, the widget 310 provides for display the single user/person view in response to the selection of one of the participants in the conversation thread.

As shown in FIG. 3, the widget 310 includes contextual information 320 that shows a participant's profile data including a photo, name and job title. The contextual information 330 includes a recent social networking update post. The contextual information 340 includes a recent set of e-mail messages from the participant. The contextual information 350 includes a calendar appointment for the participant. Lastly, the contextual information 360 includes a set of recent documents from the participant. In this manner, the widget 310 provides different contextual information for a selected participant in a single user view. Other contextual information can be provided and still be within the scope of the subject technology. In one example, the widget 310 can revert to a group view to display the participants of the conversation thread (e.g., as shown in FIGS. 1 and 2) by selecting a menu item 370.

IV. Example User Interfaces of a Conversation Thread View

Figure 4:
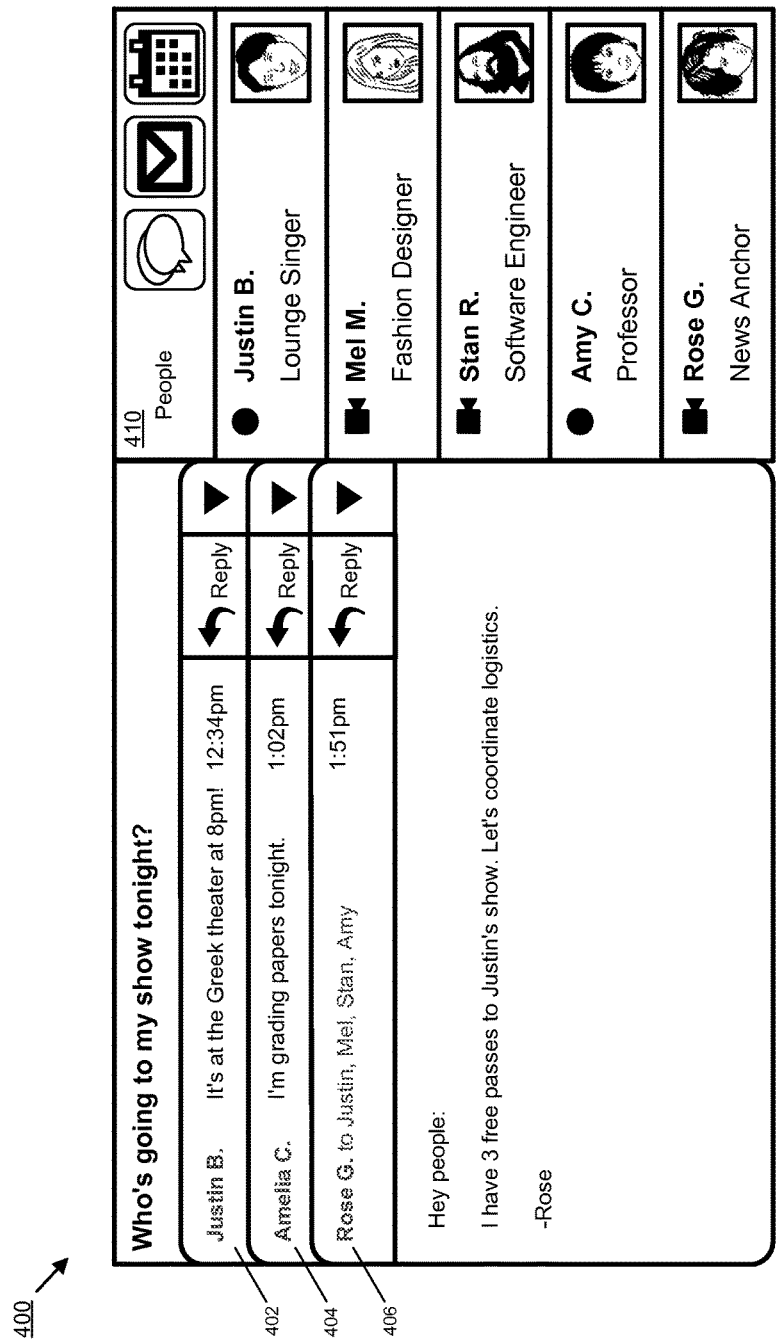
FIG. 4 conceptually illustrates an example GUI for displaying a conversation thread view of an electronic messaging application.

FIG. 4 conceptually illustrates a graphical user interface (GUI) 400 in which some configurations of the subject technology can be implemented. More specifically, the GUI 400 can include different sets of graphical elements for displaying a conversation thread view including several electronic messages (e.g., e-mails). A graphical element can include, but is not limited to, a button, check box, radio button, slider, list box, drop-down list, menu, combo box, icon, text box, scroll bar, etc. In one example, the GUI 400 is displayed in the user's e-mail or electronic messaging application.

As illustrated in FIG. 4, the GUI 400 includes a conversation thread view of a conversation including one or more different e-mails 402, 404 and 406 (or electronic messages). Each e-mail includes a message from a respective participant to the other participants of the conversation. The GUI 400 includes a widget 410 which provides for display a representation of multiple participants in a conversation thread similar to the representation of multiple participants shown in FIG. 1.

V. Example Processes for Initiating a Group Communication

Figure 5:
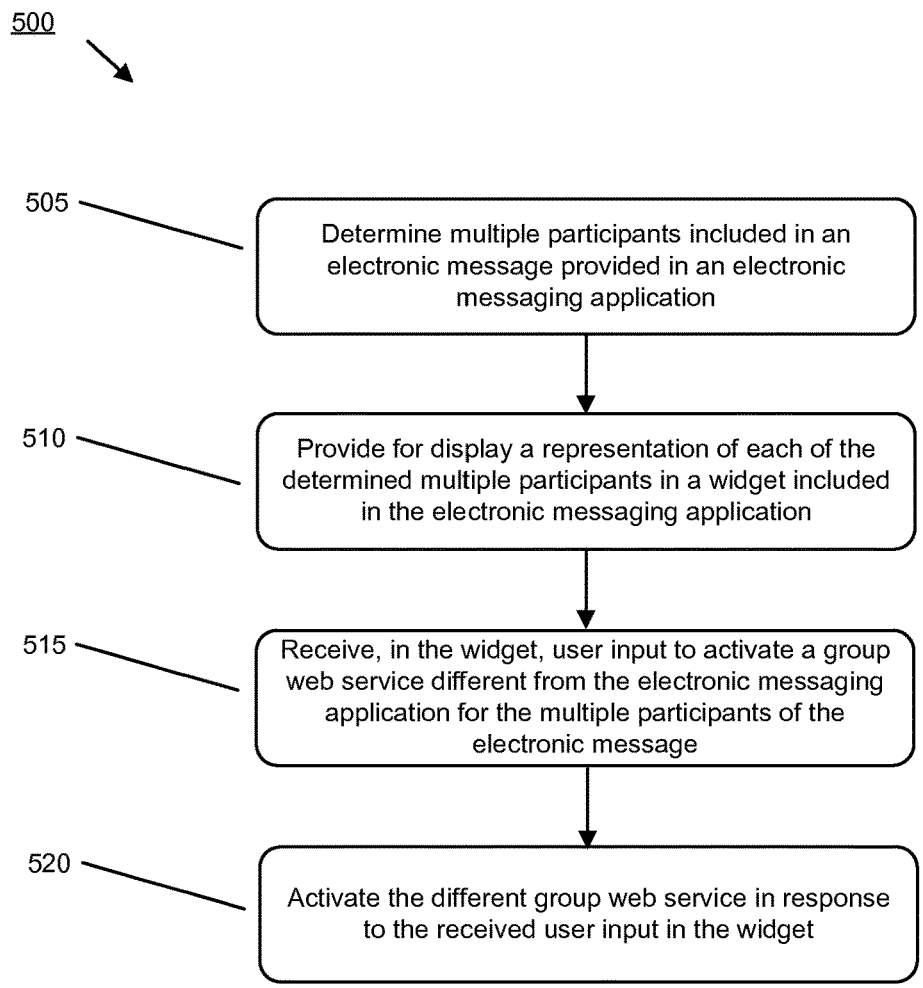
FIG. 5 conceptually illustrates an example process for initiating a group communication.

FIG. 5 conceptually illustrates an example process 500 for initiating a group communication. The process 500 is performed by one or more computing devices or systems in some configurations.

The process 500 at 505 determines multiple participants included in an electronic message provided in an electronic messaging application. In an example in which the electronic message is an e-mail message, the multiple participants are determined based on respective e-mail addresses of the multiple participants.

The process 500 at 510 provides for display a representation of each of the determined multiple participants in a widget included in the electronic messaging application. In one example, the displayed multiple participants can be displayed in a similar manner as in the example GUIs of FIGS. 1 and 4. As mentioned before, the widget is a lightweight application for extending the functionality of the electronic messaging application. In one example, the widget can be understood as a "sub-application" included or hosted in the electronic messaging application.

The process 500 at 515 receives, in the widget, user input to activate a group web service different from the electronic messaging application for the multiple participants of the electronic message. In some configurations, the user input can be a single click input including one from a mouse-click input, touch input, keyboard input, or voice input, etc. The different group web services include services such as instant messaging, video conferencing, and calendar in one example. For instance, a group web service includes one of a group chat session, a group videoconference, and a group calendar appointment in some examples. Other types of group web services can be provided and still be within the scope of the subject technology The process 500 at 520 activates the different group web service in response to the received user input in the widget. In one example, the activated different group web service initiates a communication thread in the different group web service including at least a subset of the multiple participants of the electronic message. Upon being activated, an active session is created for the group web service and different interactions and activity from each of the participants can occur or be received. In an example of a group chat session, the participants can send one or more chat messages to the other participants of the group chat session.

Figure 6:
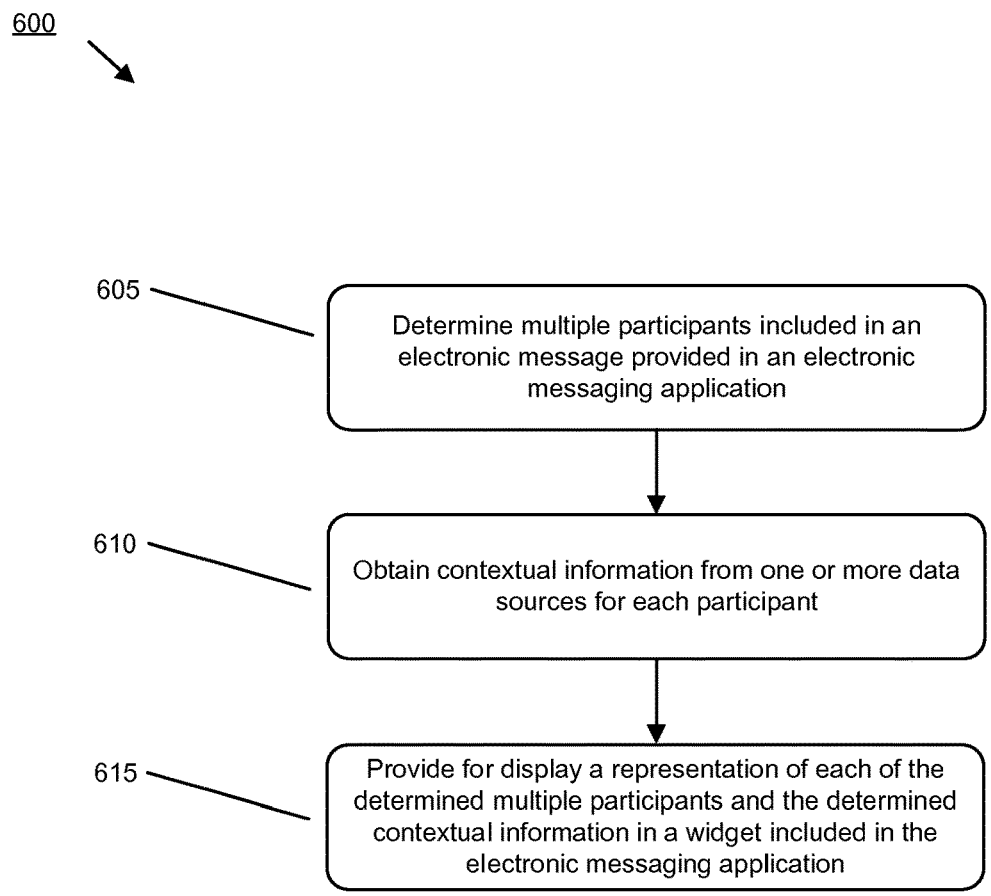
FIG. 6 conceptually illustrates an example process for providing contextual information for multiple participants of an electronic message.

VI. Example Processes for Providing Contextual Information for Multiple Participants of an Electronic Message FIG. 6 conceptually illustrates an example process 600 for providing contextual information for multiple participants of an electronic message. The process 600 is performed by one or more computing devices or systems in some configurations. For instance, a web e-mail or electronic messaging application can perform the operations in the process 600 described in further detail below in order to provide contextual information for the multiple participants of the electronic message.

The process 600 at 605 determines multiple participants included in an electronic message provided in an electronic messaging application. In an example in which the electronic message is an e-mail message, the multiple participants are determined based on respective e-mail addresses of the multiple participants.

The process 600 at 610 obtains contextual information from one or more data sources for each participant. In one example, the one or more data sources respectively correspond to an external web service. A respective participant of the electronic message is a user of the external web service. For instance, the external web service can correspond to a service such as a calendar service, online social networking service or document sharing service that is separate from the application or service providing the electronic message. In this manner, the process 600 obtains contextual information including calendar appointments, social networking status updates, or documents for each of the participants of the electronic message from the one or more data sources. Further, the contextual information includes profile data of at least one of the multiple participants. The profile data includes a user name, contact data, or an image that can based on an online social networking profile of a respective participant. Additionally, other types of external web services can be included and still be within the scope of the subject technology.

The process 600 at 615 provides for display a representation of each of the determined multiple participants and the determined contextual information in a widget included in the electronic messaging application. Some examples of displaying the multiple participants and contextual information in the widget are shown in FIGS. 1-4 as described above.

Figure 7:
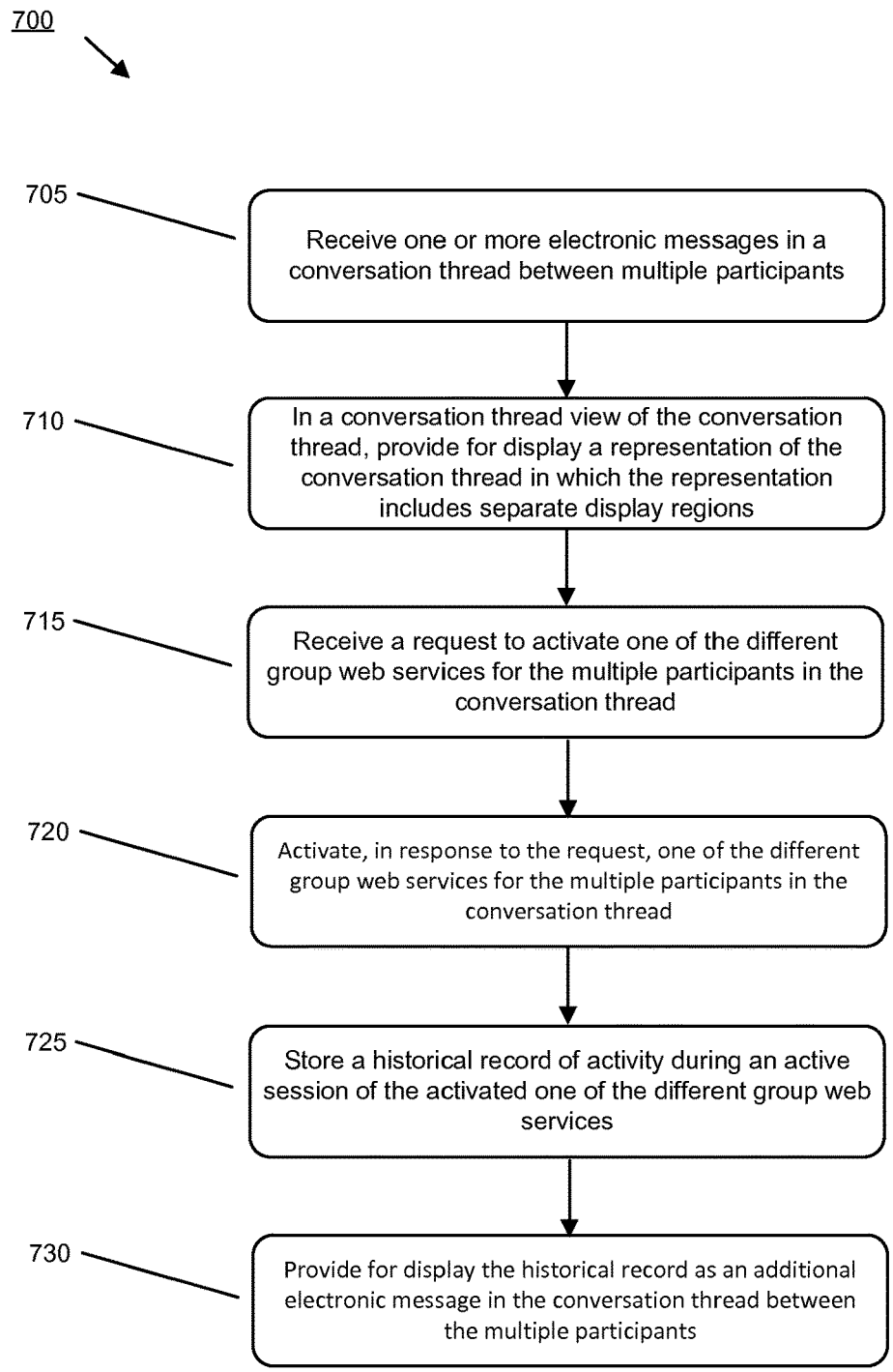
FIG. 7 conceptually illustrates an example process for providing contextual information for multiple participants of a conversation thread in an electronic messaging application.

VII. Example Processes for Providing Contextual Information for a Conversation Thread FIG. 7 conceptually illustrates an example process 700 for providing contextual information for multiple participants of a conversation thread in an electronic messaging application. The conversation thread includes one or more electronic messages (e.g., e-mail, Short Message Service (SMS), text messages, etc.) in one example. The process 700 is performed by one or more computing devices or systems in some configurations. For instance, a web e-mail or electronic messaging application can perform the operations in the process 700 described in further detail below in order to provide contextual information for the multiple participants of the conversation thread.

The process 700 at 705 receives one or more electronic messages in the conversation thread between the multiple participants. The multiple participants are respective recipients of the one or more electronic messages. In a conversation thread view of the conversation thread, the process 700 at 710 provides for display a representation of the conversation thread (e.g., as illustrated in the example shown in FIG. 4). In some configurations, the representation includes separate display regions. By way of example, the separate display regions include one or more electronic message regions respectively corresponding to each of the electronic messages in the conversation thread, a conversation participants region including different graphical elements representing the multiple participants of the conversation thread, and a group web service region including one or more graphical elements respectively representing one or more different group web services. Other display regions can be provided and still be within the scope of the subject technology.

The process 700 at 715 receives a request to activate one of the different group web services for the multiple participants in the conversation thread. In some configurations, the request is received as user input in a conversation thread view of the conversation thread. The user input can be a single click input including one from a mouse-click input, touch input, keyboard input, or voice input, etc. The different group web services include services such as instant messaging, video conferencing, e-mail, and calendar in one example. For instance, a group web service includes one of a group chat session, a group conversation thread, and a group calendar appointment in one example. Other types of group web services can be provided and still be within the scope of the subject technology.

The process 700 at 720 activates, in response to the received request, the one of the different group web services. Once activated, an active session for the group web service is ongoing and different interactions and activity from each of the participants can occur or be received. In an example of a group chat session, the participants can send one or more chat messages to the other participants of the group chat session. The process 700 at 725 stores a historical record of activity during an active session of the activated one of the different group web services. The historical record can be stored on a periodic basis (e.g., after a predetermined period of time has elapsed) or after the session for the group web service has ended (e.g., when the participants exit the group web service). Further, the process 700 at 730 provides for display the historical record as an additional electronic message in the conversation thread between the multiple participants.

VIII. Example Processes for Receiving Contextual Information

Figure 8:
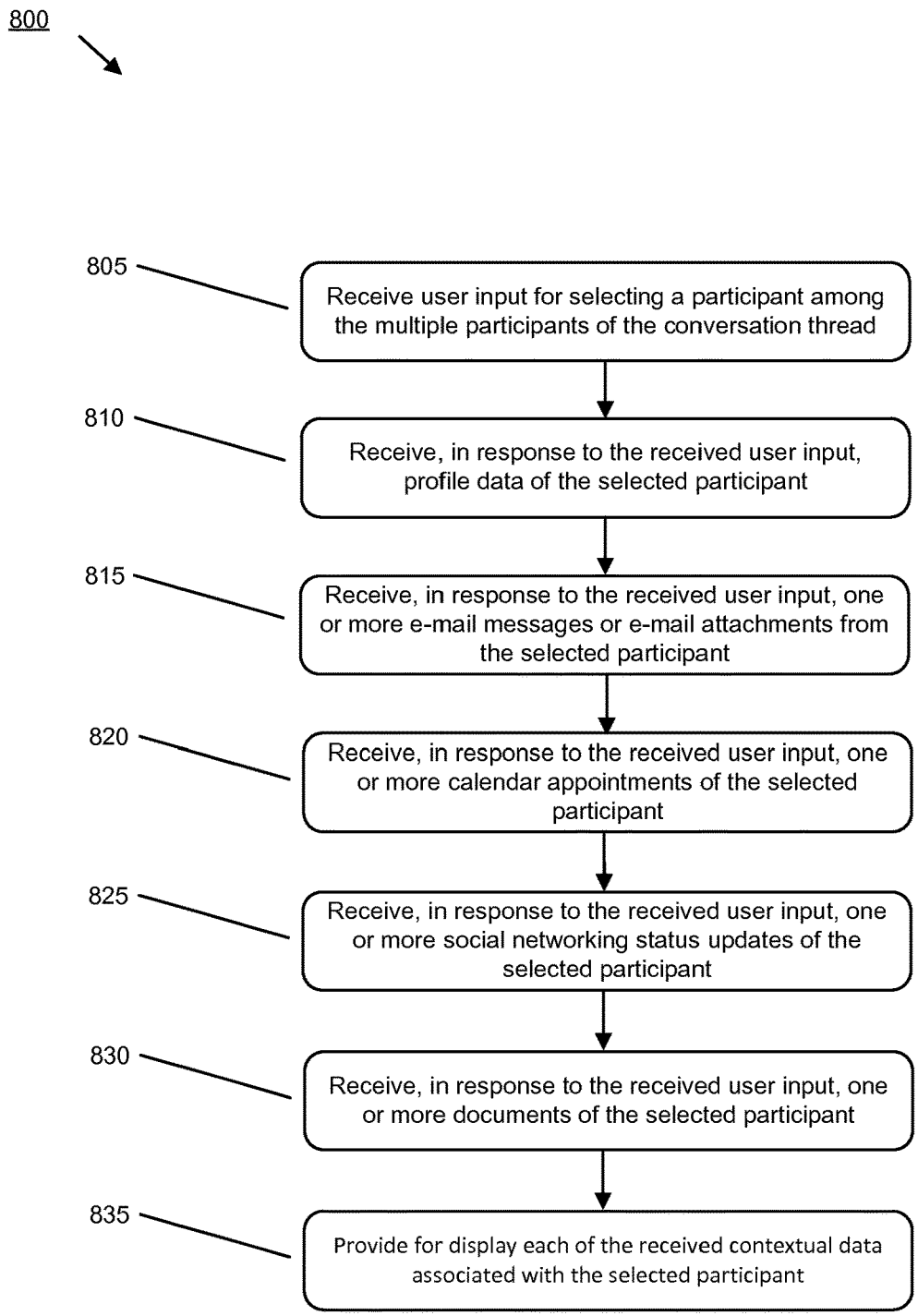
FIG. 8 conceptually illustrates an example process for receiving different types of contextual data for a participant of a conversation thread.

FIG. 8 conceptually illustrates an example process 800 for receiving different types of contextual data for a participant of a conversation thread. The process 800 is performed by one or more computing devices or systems in some configurations. In one example, the process 800 is performed when a single user/person view is activated. FIG. 3 as described above shows an example GUI that displays the result of activating the singe user/person view.

The process 800 at 805 receives user input for selecting a participant among the multiple participants of the conversation thread. In one example, the user input can be received responsive to a user selecting one of the multiple participants of the conversation thread. For instance, the user can select one of the participants shown in the GUI 100 of FIG. 1.

Responsive to the received input, the process 800 then receives different contextual data associated with the selected participant. By way of example, the process 800 can receive contextual data from one or more data sources respectively corresponding to one or more services such as e-mail, calendar, social networking, document sharing, etc. Other types of data sources can be included and still be within the scope of the subject technology. In one example, each data source is accessed over a network and provided by one or more computing devices or systems such as a server or a cluster of servers. The process 800 receives the contextual data in response to pulling (e.g., client requests the data) or aggregating the data from the aforementioned data sources in some configurations.

The process 800 at 810 receives, in response to the received user input, profile data of the selected participant. The profile data includes a name, contact data, and an image in some configurations. The process 800 at 815 receives, in response to the received user input, one or more e-mail messages and/or e-mail attachments from the selected participant. The received e-mail messages and/or e-mail attachments are aggregated e-mail messages or aggregated e-mail attachments that have been previously received by an electronic messaging application in some configurations.

The process 800 at 820 receives, in response to the received user input, one or more calendar appointments of the selected participant. The received calendar appointments are pulled from a calendar web service in one example.

The process 800 at 825 receives, in response to the received user input, one or more social networking status updates of the selected participant. The received social networking status updates are pulled from a social networking web service in one example.

The process 800 at 830 receives, in response to the received user input, one or more documents of the selected participant. The received documents are pulled from a document sharing web service in one example.

Further, the process 800 at 835 provides for display each of the received contextual data associated with the selected participant. In particular, the received contextual data includes, but is not limited to, the aforementioned profile data, e-mail messages, e-mail attachments, calendar appointments, social networking status updates, and documents.

IX. Example Computing Environment

Figure 9:
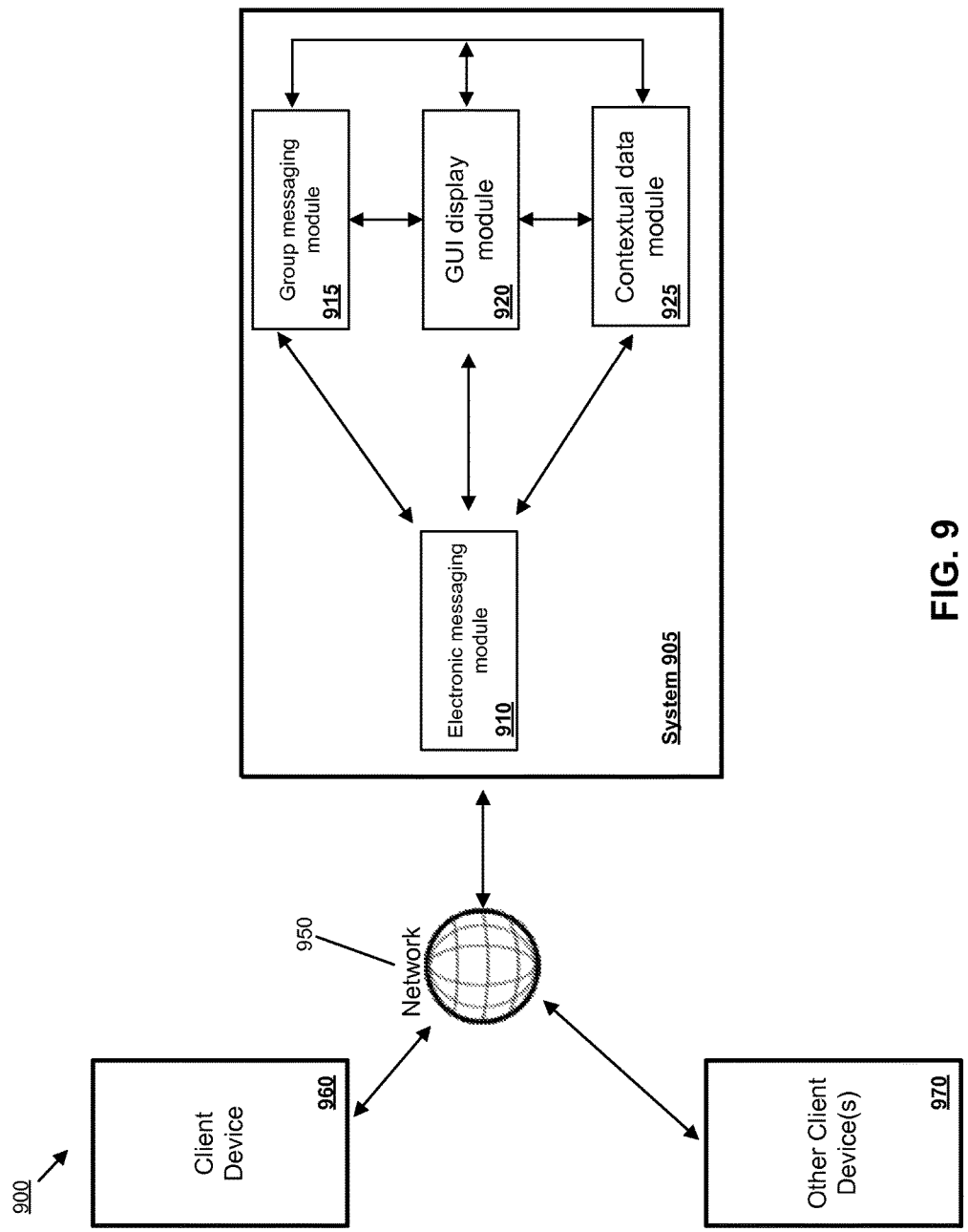
FIG. 9 conceptually illustrates an example computing environment.

FIG. 9 conceptually illustrates an example computing environment 900 including a system. In particular, FIG. 9 shows a system 905 for implementing the above described processes in FIGS. 5-8 and for providing the GUIs illustrated in FIGS. 1-4. In some configurations, the system 905 is part of an implementation running a particular machine (e.g., a server).

The system 905 can include memory, one or more processors, and one or more modules stored in memory and configured for execution by the one or more processors. As shown in FIG. 9, the system 905 includes several modules for providing different functionality. The system 905 is configured to include an electronic messaging module 910 configured to receive one or more electronic messages in a conversation thread between multiple participants, a group messaging module 915 configured to activate one of different web services between the multiple participants, a graphical user interface (GUI) display module 920 configured to, in a conversation thread view of the conversation thread, provide for display a representation of the conversation thread in which the representation includes separate display regions, and a contextual data module 925 configured to receive user input for selecting a participant among the multiple participants of the conversation thread, and receive, in response to the received user input, different contextual data associated with the selected participant. The different contextual data includes at least one of profile data, an e-mail message, a document, a calendar appointment, and a social networking status update in one example.

In some configurations, the aforementioned separate display regions include one or more electronic message regions respectively corresponding to each of the electronic messages in the conversation thread, a conversation participants region including different graphical elements representing the multiple participants of the conversation thread, and a group web service region including one or more graphical elements respectively representing one or more different group web services.

The GUI display module 920 is further configured to provide for display the received contextual data associated with the selected participant. The group messaging module 915 is further configured to store a historical record of activity during an active session of the activated one of the different group web services. Additionally, the GUI display module 920 is configured to provide for display the historical record as an additional electronic message in the conversation thread between the multiple participants.

As further shown in FIG. 9, each of the aforementioned modules can be configured to communicate between each other. For instance, different data, messages, API calls and returns can be passed between the different modules in the system 905.

The system 905 can communicate over a network 950 with a client 960. The client 960 can each be configured to communicate with the aforementioned modules of the system 905. For instance, the system 905 can transmit a request for interacting (e.g., for a group web service) with the client 960 over the network 950 to the client 960. As further shown in FIG. 9, the system 905 can communicate over the network 950 with other client(s) 970 in a similar manner.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

X. Example System

The following description describes an example system in which aspects of the subject technology can be implemented.

Figure 10:
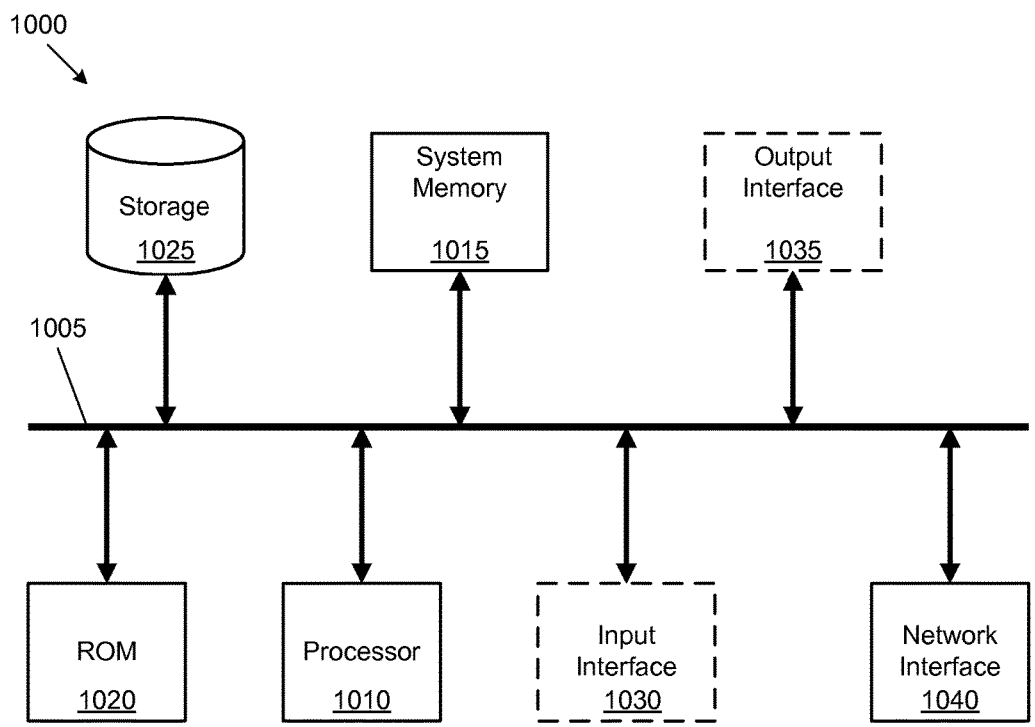
FIG. 10 conceptually illustrates a system with which some implementations of the subject technology may be implemented.

FIG. 10 conceptually illustrates a system 1000 with which some implementations of the subject technology can be implemented. The system 1000 can be a computer, phone, PDA, television with one or more processors attached thereto and/or embedded therein, or any other sort of electronic device. In some configurations, the system 1000 includes a television with one or more processors embedded therein. Such a system includes various types of computer readable media and interfaces for various other types of computer readable media. The system 1000 includes a bus 1005, processing unit(s) 1010, a system memory 1015, a read-only memory 1020, a storage device 1025, an optional input interface 1030, an optional output interface 1035, and a network interface 1040.

The bus 1005 collectively represents all system, peripheral, and chipset buses that communicatively connect the numerous internal devices of the system 1000. For instance, the bus 1005 communicatively connects the processing unit(s) 1010 with the read-only memory 1020, the system memory 1015, and the storage device 1025.

From these various memory units, the processing unit(s) 1010 retrieves instructions to execute and data to process in order to execute the processes of the subject technology. The processing unit(s) can be a single processor or a multi-core processor in different implementations.

The read-only-memory (ROM) 1020 stores static data and instructions that are needed by the processing unit(s) 1010 and other modules of the system 1000. The storage device 1025, on the other hand, is a read-and-write memory device. This device is a non-volatile memory unit that stores instructions and data even when the system 1000 is off. Some implementations of the subject technology use a mass-storage device (such as a magnetic or optical disk and its corresponding disk drive) as the storage device 1025.

Other implementations use a removable storage device (such as a flash drive, a floppy disk, and its corresponding disk drive) as the storage device 1025. Like the storage device 1025, the system memory 1015 is a read-and-write memory device. However, unlike storage device 1025, the system memory 1015 is a volatile read-and-write memory, such a random access memory. The system memory 1015 stores some of the instructions and data that the processor needs at runtime. In some implementations, the subject technology's processes are stored in the system memory 1015, the storage device 1025, and/or the read-only memory 1020. For example, the various memory units include instructions for processing multimedia items in accordance with some implementations. From these various memory units, the processing unit(s) 1010 retrieves instructions to execute and data to process in order to execute the processes of some implementations.

The bus 1005 also connects to the optional input and output interfaces 1030 and 1035. The optional input interface 1030 enables the user to communicate information and select commands to the system. The optional input interface 1030 can interface with alphanumeric keyboards and pointing devices (also called "cursor control devices"). The optional output interface 1035 can provide display images generated by the system 1000. The optional output interface 1035 can interface with printers and display devices, such as cathode ray tubes (CRT) or liquid crystal displays (LCD). Some implementations can interface with devices such as a touchscreen that functions as both input and output devices.

Finally, as shown in FIG. 10, bus 1005 also couples system 1000 to a network interface 1040 through a network adapter (not shown). In this manner, the computer can be a part of a network of computers (such as a local area network ("LAN"), a wide area network ("WAN"), or an Intranet, or an interconnected network of networks, such as the Internet. Any or all components of system 1000 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people.

For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A machine-implemented method for initiating a group communication, the method comprising:
   determining, using one or more computing devices, multiple participants included in an electronic message provided in an electronic messaging application;
   providing for display, using the one or more computing devices, a representation of the electronic message, including each of the determined multiple participants, in a widget included in the electronic messaging application;
   receiving, in the widget, first user input selecting, from the representation of the electronic message, a group of selected participants from among the multiple participants;
   receiving, in response to the received first user input, contextual data from one or more group web services for group communication different from the electronic messaging application while the electronic messaging application is active and displayed, the contextual data corresponding to the group of the selected participants;
   providing the received contextual data for display;
   receiving, in the widget while the representation of the electronic message is active and displayed and while the group of selected participants are selected, second user input selecting to activate one of the group web services for the group of selected participants of the electronic message, the selected group web service being a different type of communication application than the electronic messaging application;
   activating, while the electronic messaging application is active and displayed, the selected different group web service in response to the received second user input in the widget, wherein the activated different group web service initiates a communication thread in the activated different group web service including the group of selected participants of the electronic message.

2. The method of claim 1, wherein determining the multiple participants included in the electronic message is based on respective e-mail addresses of the multiple participants,
   storing a historical record of activity of the activated different group web service during an active session of the activated different group web service; and
   providing the historical record for display to the multiple participants as an additional electronic message in the electronic message provided in the electronic messaging application.

3. The method of claim 1, wherein the widget is a sub-application included in the electronic messaging application.

4. The method of claim 1, wherein the activated different group web service includes one of a group chat session or a group calendar appointment.

5. The method of claim 1, wherein an active session for the activated different group web service is created upon activating the selected different group web service.

6. The method of claim 1, wherein the second user input comprises a single click input.

7. The method of claim 6, wherein the single click input includes one from a mouse-click input, touch input, keyboard input, or voice input.

8. A system for providing contextual information for multiple participants of a conversation thread, the system comprising one or more computing devices, the one or more computing devices comprising:
   memory;
   one or more processors;
   one or more modules stored in memory and configured for execution by the one or more processors, the modules comprising:
      an electronic messaging module configured to receive one or more electronic messages in a conversation thread between multiple participants;
      a group messaging module configured to activate, in response to a selection of the multiple participants from a display of the one or more electronic messages, a selected web service of different web services for group communication between the multiple participants while the one or more electronic messages are received and displayed in the conversation thread, the selected web service being a different type of communication application than an application displaying the one or more electronic messages in the conversation thread;
      a contextual data module configured to receive user input for selecting a participant from among the multiple participants, and to receive, in response to the received user input, contextual data from at least one of the different web services while the one or more electronic messages are received and displayed in the conversation thread, the contextual data corresponding to the selected participant;
      a graphical user interface (GUI) display module configured to provide a representation of the conversation thread for display within a conversation thread view of the conversation thread, wherein the representation includes separate display regions, and configured to provide the contextual data for display, storing a historical record of activity of the activated different group web service during an active session of the activated different group web service; and providing the historical record for display to the multiple participants as an additional electronic message in the electronic message provided in the electronic messaging application.

9. The system of claim 8, wherein the separate display regions comprise:
  one or more electronic message regions respectively corresponding to each of the electronic messages in the conversation thread;
  a conversation participants region including different graphical elements representing the multiple participants of the conversation thread; and
  a group web service region including one or more graphical elements respectively representing one or more of the different group web services.

10. The system of claim 8, wherein the contextual data includes at least one of profile data, an e-mail message, a document, a calendar appointment, or a social networking status update, corresponding to the selected participant, and received from respective ones of the different web services.

11. A non-transitory machine-readable medium comprising instructions stored therein, which when executed by one or more computing devices, cause the one or more computing devices to perform operations comprising:
  receiving one or more electronic messages in a conversation thread between multiple participants;
  in a conversation thread view of the conversation thread, providing a representation of the conversation thread for display, wherein the representation includes separate display regions, the separate display regions comprising:
    one or more electronic message regions respectively corresponding to each of the electronic messages in the conversation thread;
    a conversation participants region including different graphical elements representing the multiple participants of the conversation thread; and
    a group web service region including graphical elements respectively representing different web services for group communication;
  receiving user input for selecting, from displayed representation of the conversation thread, a group of participants from among the multiple participants of the conversation thread;
  activating a different group web service, of the different web services, for group communication between the selected group of participants while one or more electronic messages are received and displayed in the conversation thread, the different group web service being a different type of communication application than an application displaying the representation of the conversation thread;
  receiving contextual data from at least one of the different web services while the different group web service is active, the contextual data corresponding to a selected participant of the multiple participants;
  providing the contextual data associated with the selected participant for display,
  storing a historical record of activity of the activated different group web service during an active session of the activated different group web service; and
  providing the historical record for display to the multiple participants as an additional electronic message in the electronic message provided in the electronic messaging application.

12. The non-transitory machine-readable medium of claim 11, wherein the activated different group web service includes one of a group chat session or a group calendar appointment.

13. The non-transitory machine-readable medium of claim 11, wherein an active session for the activated different group web service is created upon activating the selected different group web service.

14. The non-transitory machine-readable medium of claim 11, the operations further comprising:
  storing a historical record of activity of the different group web service during an active session of the different group web service.

15. The non-transitory machine-readable medium of claim 14, the operations further comprising:
  providing the historical record for display, as an additional electronic message, to the multiple participants as an additional electronic message in the conversation thread between the multiple participants.

16. The non-transitory machine-readable medium of claim 11, wherein the contextual data includes at least one of profile data, an e-mail message, a document, a calendar appointment, or a social networking status update, corresponding to the selected participant, and received from respective ones of the different web services.

* * * * *